(12) United States Patent
Sano et al.

(10) Patent No.: US 6,282,968 B1
(45) Date of Patent: Sep. 4, 2001

(54) STEERING SENSOR UNIT

(75) Inventors: Tadashi Sano; Katsuya Mitsuzuka; Hironori Kato; Yukari Sano, all of Miyagi-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 08/868,657

(22) Filed: Jun. 4, 1997

(30) Foreign Application Priority Data

Jun. 5, 1996 (JP) ...................................................... 8-142877

(51) Int. Cl.$^7$ ...................................................... G01L 1/00
(52) U.S. Cl. ........................................ 73/862.08; 73/118.1
(58) Field of Search ............................... 73/118.1, 862.08, 73/862, 862.041, 862.042

(56) References Cited

U.S. PATENT DOCUMENTS

| | | | |
|---|---|---|---|
| 3,580,352 | * | 5/1971 | Hestad et al. ..................... 73/862.325 |
| 5,195,383 | * | 3/1993 | Tanaka et al. ..................... 73/862.325 |
| 5,220,162 | | 6/1993 | Umehara ............................. 250/231 |
| 5,394,760 | * | 3/1995 | Persson et al. .................. 73/862.331 |

\* cited by examiner

*Primary Examiner*—Eric S. McCall
(74) *Attorney, Agent, or Firm*—Brinks Hofer Gilson & Lione

(57) ABSTRACT

Disclosed is a steering sensor unit which can highly accurately detect the rotational angle of a steering wheel, can be easily mounted on a steering shaft, and ensures satisfactory operability after mounted on the steering shaft. A rotor of a steering sensor has joint portions provided thereon for transmitting rotation of a steering wheel to the rotor. When the steering sensor unit is mounted on a steering shaft, the steering sensor is disposed in a position close to the steering wheel and the rotary connector is disposed below the steering sensor. Elastic engagement bosses are formed at distal ends of the joint portions. The rotor and the steering wheel are coupled to each other by fitting the elastic engagement bosses into engagement holes bored in a central hub of the steering wheel.

15 Claims, 5 Drawing Sheets

STEERING SENSOR UNIT

BACKGROUND OF THE INVENTION

1. Field of the Invention

The present invention relates to a steering sensor unit which is mounted on a steering shaft of an automobile or the like for detecting information about rotation of a steering wheel and establishing electrical connection between both electric systems provided on the steering wheel and a vehicle body.

2. Description of the Related Art

Heretofore, the so-called steering sensor unit has been proposed which has a one-piece structure comprising a steering sensor for detecting information about rotation of a steering wheel and a rotary connector for electrically connecting an electric system on the steering wheel and an electric system on a vehicle body to each other.

A steering sensor detects the angle and the direction by and in which a steering wheel is turned, and provides information for use in, e.g., damping force control of suspensions, shift position control of an automatic transmission, and steering control of rear wheels in four-wheel steerable (4WS) vehicles. Generally, the steering sensor comprises a code plate attached to a rotor rotated by the steering wheel, and a pair of light emitting and receiving devices disposed on an inner surface of a case (or a casing) which serves as a stator. On the other hand, a rotary connector is capable of establishing and maintaining electrical connection between an electric system provided on the steering wheel as a rotatable member and an electric system provided on a vehicle body as a stationary member. Rotary connectors are mainly divided into two types. In one type, a flexible electric cable or an optical fiber cable (hereinafter referred to generically as a cable) is disposed in a loosely coiled state between a rotor rotated by the steering wheel and a case serving as a stator, the cable having one end fixedly connected to the rotor and the other end fixedly connected to the stator. Electrical connection between the electric systems on both sides can be maintained through reeling-in and -out of the loosely coiled cable. In the other type, one or more isolated electrical paths are formed on a rotor rotated by the steering wheel, and a brush provided on a case serving as a stator is held in slide contact with the electrical paths. Electrical connection between the electric systems on both sides can be maintained through electrical contacts between the electrical paths and the brush.

To reduce the size and simplify the structure, a conventional steering sensor unit is constructed such that a code plate as a component of a steering sensor is held between a rotor of the steering sensor and a rotor of a rotary connector, the two rotors and the code plate being screwed together into a one-piece unit. Looking at circumstances until now, steering sensor units have been developed from rotary connectors, and rotary connectors have been mainly employed to activate air bag devices and disposed near steering wheels so far. For this reason, when mounting the conventional steering sensor unit on a steering shaft, it has been customary that the rotary connector is disposed in a position adjacent to the steering wheel, the steering wheel and the rotor of the rotary connector are coupled to each other by a joint portion formed on the rotor, and the steering sensor is disposed below the rotary connector. Further, in the conventional steering sensor unit, input/output terminals of drive circuits for a light emitting device and a light receiving device are disposed on an outer circumferential surface of a case covering the code plate.

Meanwhile, steering sensor units for use with steering wheels of automobiles to detect a steering angle, for example, are particularly required to have high accuracy in detection of the steering angle for realizing various control processes with high accuracy. Those steering sensor units are also required to be small in size for facilitating design and layout of components around the driver's seat. Further, those steering sensor units are required to have good operability so that smooth operation of the steering wheel will not be impaired.

However, the conventional steering sensor unit has problems as follows. The steering sensor unit is mounted on the steering shaft such that the rotary connector is disposed in a position adjacent to the steering wheel and the steering sensor is disposed below the rotary connector. Accordingly, for example, when the steering wheel is abruptly turned, a torsion due to elastic deformation of the parts tends to occur in a system leading from the joint portion to the rotor of the steering sensor through the rotor of the rotary connector. This results in that a delay in rotation of the rotor of the steering sensor with respect to the rotation of the steering wheel is increased and hence the steering sensor cannot output an accurate pulse signal corresponding to the rotation of the steering wheel. Also, when the operating (rotating) direction of the steering wheel is changed, there occurs the so-called hysteresis that an output signal of the steering sensor has different values even at the same rotational position between when the steering wheel is turned clockwise and when the steering wheel is turned counterclockwise. This also makes it difficult to detect the rotational angle of the steering wheel with high accuracy.

Further, the use of the rotary connector as a device for electrically connecting an electric system on the steering wheel and an electric system on the vehicle body to each other raises another problem below. Specifically, in any type of the rotary connector wherein electrical connection is maintained through reeling-in and -out of a loosely coiled cable, or by holding a brush disposed on a case serving as a stator in slide contact with electrical paths disposed on a rotor, a clearance must be kept between the rotor and the case serving as the stator for ensuring smooth rotation of the rotor. Therefore, an eccentricity tends to occur between the rotor and the case when the rotor of the rotary connector is coupled to the steering wheel through the joint portion provided on the rotor of the rotary connector and the case of the rotary connector is attached to a predetermined mounting portion set on the vehicle body. Because the rotor of the steering sensor and the rotor of the rotary connector are joined together and an integral case is used to cover both the steering sensor and the rotary connector, an eccentricity occurred between the rotor of the rotary connector and the case would give rise to an eccentricity between the rotor of the steering sensor and the case as well. In this respect, with the steering sensor disposed below the rotary connector, the amount of eccentricity between the rotor of the steering sensor and the case would be larger than the amount of eccentricity between the rotor of the rotary connector and the case. Thus, the accuracy in detecting the rotational angle of the steering wheel is deteriorated correspondingly.

Also, even if the rotor of the steering sensor is coupled to the steering wheel and the rotary connector is disposed below the steering sensor, an eccentricity occurred between the rotor of the rotary connector and the case would deviate the rotor of the steering sensor as well and hence deteriorate the accuracy in detecting the rotational angle of the steering wheel similarly to the above.

Further, in the conventional steering sensor unit, because an external output connector of the steering sensor is disposed on the outer circumferential surface of the case covering the code plate, the steering sensor has a large size in the radial direction. This leads to disadvantages of restricting the degree of freedom in design and layout of components around the driver's seat and reducing the efficiency of wiring and other incidental work.

SUMMARY OF THE INVENTION

With the view of overcoming the above-mentioned problems in the related art, an object of the present invention is to provide a steering sensor unit which can highly accurately detect the rotational angle of a steering wheel and enables damping force control of suspensions, shift position control of an automatic transmission, steering control of rear wheels in 4WS vehicles, etc. to be performed with high accuracy. Another object of the present invention is to provide a steering sensor unit which can highly accurately detect the rotational angle of a steering wheel, is small in size, and ensures satisfactory efficiency of wiring and other incidental work. Still another object of the present invention is to provide a steering sensor unit which can highly accurately detect the rotational angle of a steering wheel, can be easily mounted on a steering shaft, and ensures satisfactory operability after mounted on the steering shaft.

To achieve the above objects, according to a first aspect of the present invention, in a steering sensor unit comprising a steering sensor for detecting information about rotation of a steering wheel and a rotary connector for electrically connecting an electric system provided on the steering wheel and an electric system provided on a vehicle body, a rotor of the steering sensor is provided with a joint portion for transmitting rotation of the steering wheel to the rotor of the steering sensor, the steering sensor unit is mounted on a steering shaft such that the steering sensor is disposed in a position close to the steering wheel and the rotary connector is disposed below the steering sensor, and the rotor of the steering sensor is coupled to a rotor of the rotary connector.

According to a second aspect of the present invention, in a steering sensor unit comprising a steering sensor for detecting information about rotation of a steering wheel and a rotary connector for electrically connecting an electric system provided on the steering wheel and an electric system provided on a vehicle body, a rotor of the steering sensor and a rotor of the rotary connector are provided with joint portions for transmitting rotation of the steering wheel respectively to the rotor of the steering sensor and the rotor of the rotary connector, and the steering sensor unit is mounted on a steering shaft such that the steering sensor is disposed in a position close to the steering wheel and the rotary connector is disposed below the steering sensor.

By virtue of the arrangement that the steering sensor is disposed in a position close to the steering wheel and the rotary connector is disposed below the steering sensor, the distance from the steering wheel to the steering sensor is reduced. Accordingly, even when a torsion occurs in a system including the joint portion, the rotor of the steering sensor 1 and the rotor of the rotary connector, the amount of torsion in the installed position of a code plate is kept small and a delay in rotation of the steering sensor with respect to rotation of the steering wheel is also kept small. As a result, response and hysteresis of a pulse signal output from the steering sensor are improved and the accuracy in detecting the rotational angle of the steering wheel can be improved.

Further, a clearance to be maintained between the rotor and a casing (or a case) making up the steering sensor is not required to be so large as a clearance to be maintained between the rotor and a casing (or a case) making up the rotary connector. Therefore, when the rotor of the steering sensor is coupled to the steering wheel, the casing of the steering sensor is automatically arranged substantially in coaxial relation to the steering wheel. Thus, by virtue of the arrangement that the steering sensor is disposed in a position close to the steering wheel and the rotor of the steering sensor is coupled to the steering wheel, an eccentricity occurred between the rotor and the casing serving as a stator can be reduced and the accuracy in detecting the rotational angle of the steering wheel can be improved.

In the steering sensor unit of the present invention, the rotor of the steering sensor and the rotor of the rotary connector may be joined into a one-piece structure, or may be coupled to each other through any suitable eccentricity absorbing means. The eccentricity absorbing means may comprise, for example, a bellows coupling or a universal joint.

By virtue of the arrangement that both the rotors are coupled to each other through the suitable eccentricity absorbing means, even if the casing is mounted in eccentric relation to the rotor of the rotary connector, the eccentricity can be absorbed by the eccentricity absorbing means and smooth operability of the rotary connector can be always ensured. Therefore, operability of the steering wheel can be maintained satisfactorily.

Further, in the steering sensor unit of the present invention, an external output terminal or connector of the steering sensor is preferably disposed on a bottom surface of the casing for the rotary connector.

By virtue of the arrangement that the external output terminal of the steering sensor is disposed on the bottom surface of the casing for the rotary connector, the radial size of the steering sensor unit can be made smaller than that would be resulted if the external output terminal is disposed on a peripheral surface of the steering sensor, i.e., an outer circumferential surface of the casing covering the code plate. This leads to the increased degree of freedom in design and layout of components around the driver's seat. Further, since a wider space is left around the steering sensor unit, the efficiency of wiring and other incidental work can be improved.

DESCRIPTION OF THE PREFERRED EMBODIMENTS

Figure 1:
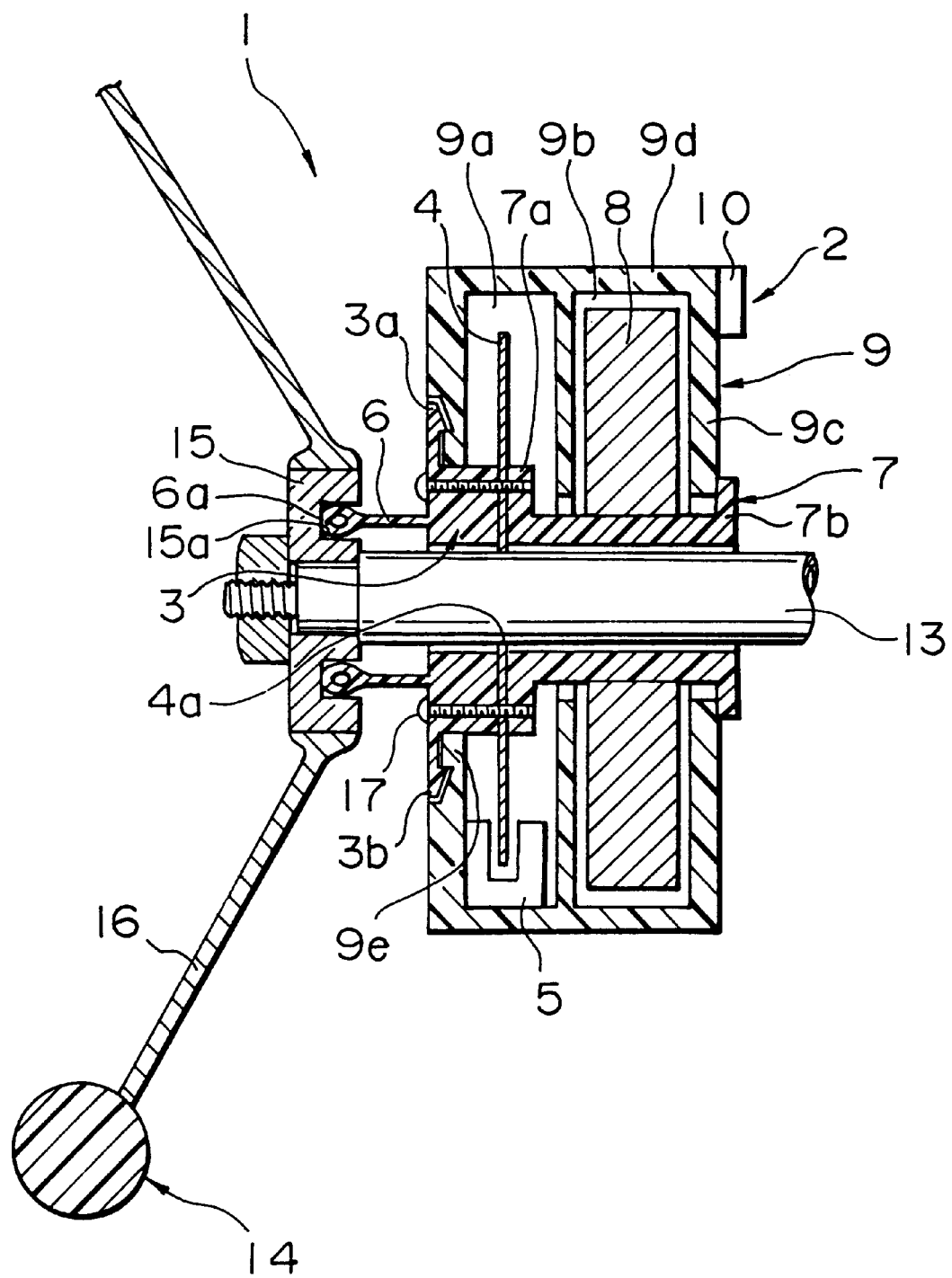
FIG. 1 is a cross-sectional view of a steering sensor unit according to a first embodiment.
Figure 2:
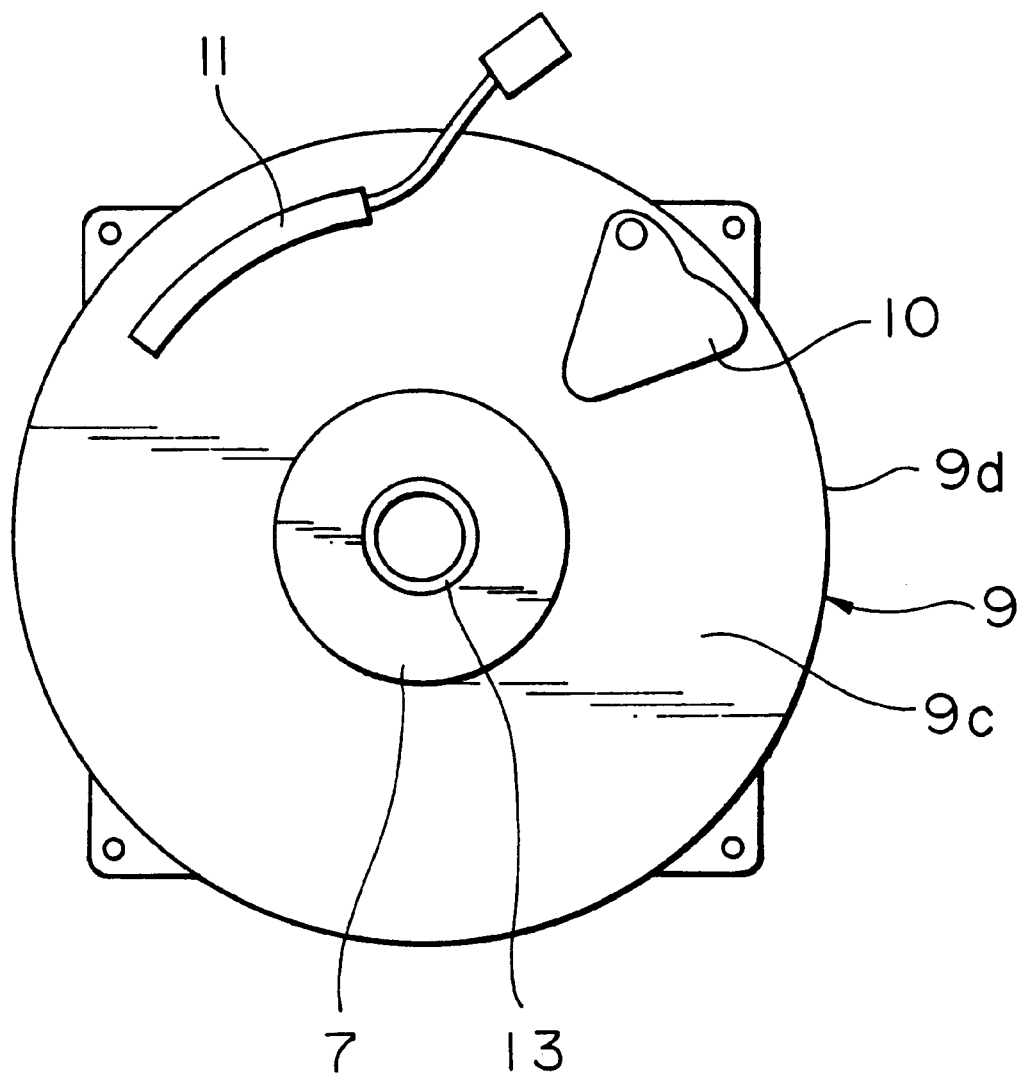
FIG. 2 is a side view of the steering sensor unit according to the first embodiment.

A first embodiment of the steering sensor unit according to the present invention will be described with reference to FIGS. 1 and 2. FIG. 1 is a cross-sectional view of the steering sensor unit of this embodiment in a mounted state and FIG. 2 is a side view of the steering sensor unit, looking from the rotary connector side.

In these figures, denoted by reference numeral 1 is a steering sensor or steering angel sensor, 2 is a rotary connector, 3 is a rotor of the steering sensor 1, 4 is a code plate of the steering sensor 1, 5 is a signal detecting portion of the steering sensor 1, 6 is a joint portion provided on the rotor 3 for connection with a steering wheel, 7 is a rotor of a rotary connector 2, 8 is a cable for the rotary connector 2, 9 is a casing of the steering sensor 1 and the rotary connector 2, 10 is an external output connector of the steering sensor 1, 11 is an external output cable extending from the rotary connector 2, 13 is a steering shaft, 14 is a steering wheel, 15 is a hub at the center of the steering wheel 14, 16 is a spoke of the steering wheel 14, and 17 is a screw for fastening the rotor 3 of the steering sensor 1, the code plate 4 and the rotor 7 of the rotary connector 2 together.

The rotor 3 of the steering sensor 1 is in the form of a ring having an inner diameter enough to allow the steering shaft 13 to penetrate therethrough. A fitting piece 3b provided at its distal end with a fitting pawl 3a is projected outward from an outer circumferential surface of the rotor 3 at its one end. The fitting piece 3b may be formed of a circular plate or a set of radially extending plates. Further, the rotor 3 has a plurality of joint portions 6 vertically projecting from one end surface thereof and having elastic engagement bosses 6a at distal ends of the joint portions 6.

The rotor 7 of the rotary connector 2 is in the form of a cylinder having an inner diameter enough to allow the steering shaft 13 to penetrate therethrough. At opposite ends of the rotor 7, a joint portion 7a and a casing holding portion 7b are provided in the form of a flange to extend vertically to the steering shaft 13. The joint portion 7a which is connected to the rotor 3 of the steering sensor 1 through the code plate 4 has a width or a radial height substantially equal to that of the rotor 3 of the steering sensor 1. On the contrary, the casing holding portion 7b has a width or a radial height selected such that it is engageable with one end of the casing 9 in a detachable manner.

The code plate 4 is formed of, e.g., an opaque plastic or metallic plate having a central hole 4a through which the steering shaft 13 can penetrate. The code plate 4 also has through holes formed therein and arrayed circumferentially in a predetermined pattern for optically detecting an index signal and an incremental signal. The shape and array of the through holes are not shown here because they are known in the art and not pertained to the gist of the present invention.

The rotor 3 of the steering sensor 1, the code plate 4 and the rotor 7 of the rotary connector 2 are, as shown in FIG. 1, assembled in coaxial relation to one another and joined into a one-piece structure by inserting a plurality of screws 17 through screw penetration holes bored in the rotor 3 of the steering sensor 1 and screw penetration holes bored in the code plate 4 and then meshing the screws 17 into threaded holes formed in the rotor 7 of the rotary connector 2.

The casing 9 comprises a steering sensor portion 9a for covering the code plate 4 in surrounding relation, and a rotary connector portion 9b for housing the cable 8 therein. Fitting pawls 9c are formed on the casing 9 at positions corresponding to the fitting pawls 3a and enable the casing 9 to be detachably attached in place to surround the two rotors 3, 7 and the code plate 4 which are joined into a one-piece structure. Secured to an inner surface of the steering sensor portion 9a is the signal detecting portion 5 for optically detecting an index signal and an incremental signal, i.e., rotational angle detected signals, in cooperation with the code plate 4. On the other hand, the cable 8 is housed within the rotary connector portion 9b in a loosely coiled state, one end of the cable 8 being fixed to the rotor 7 and the other end thereof being fixed to the rotary connector portion 9b. The cable 8 is led out from an end surface 9c of the rotary connector portion 9b, and the external output cable 11 is connected to a distal end of the led-out cable. Further, the external output connector 10 of the steering sensor 1 is attached as an integral connector to the end surface 9c of the rotary connector portion 9b. The external output connector 10 is disposed such that at least its outermost peripheral end will not project outward beyond an outer circumferential surface 9d of the rotary connector portion 9b.

Thus, the steering sensor unit of this embodiment is mounted on the steering shaft 13, as shown in FIG. 1, such that the steering sensor 1 is positioned close to the steering wheel 14 and the rotary connector 2 is disposed below the steering sensor 1. The steering sensor 1 and the steering wheel 14 are coupled to each other by inserting the distal ends of the joint portions 6 projecting from the rotor 3 in engagement holes 15a bored in the central hub 15 of the steering wheel 14. In other words, because of the elastic engagement bosses 6a formed at the distal ends of the joint portions 6, the steering sensor 1 can be tightly joined to the central hub 15 of the steering wheel 14 without looseness therebetween by press-fitting the elastic engagement bosses 6a into the engagement holes 15a.

In the steering sensor unit of this embodiment, since the steering sensor 1 is disposed in a position close to the steering wheel 14 and the rotary connector 2 is disposed below the steering sensor 1, the distance from the steering wheel 14 to the installed position of the code plate 4 can be made smaller than that would be resulted if the rotary connector 2 is located on the side near the steering wheel 14. Accordingly, even when a torsion occurs in a system including the joint portions 6, the rotor 3 of the steering sensor 1 and the rotor 7 of the rotary connector 2 upon the steering wheel 14 being turned abruptly, for example, the amount of torsion in the installed position of the code plate 4 is kept small and a delay in rotation of the steering sensor 1 with respect to rotation of the steering wheel 14 is also kept small. As a result, response and hysteresis of a pulse signal output from the steering sensor 1 are improved and the accuracy in detecting the rotational angle of the steering wheel 14 can be improved.

Also, in the steering sensor unit of this embodiment, since the steering sensor 1 is disposed in a position close to the steering wheel 14 and the joint portions 6 provided on the rotor 3 of the steering sensor 1 are coupled to the steering wheel 14, the axis common to the rotor 3 of the steering sensor 1, the code plate 4 and the rotor 7 of the rotary connector 2 can be automatically aligned with the axis of the steering shaft 13 by press-fitting the elastic engagement bosses 6a of the joint portions 6 into the engagement holes 15a bored in the central hub 15 of the steering wheel 14. On the other hand, since the casing 9 is joined to the rotor 3 of the steering sensor 1 through the fitting pawls 3a, 9c, it is installed in concentric relation to both the rotors 3, 7 and the code plate 4 automatically when the two rotors 3, 7 and the code plate 4 are mounted around the steering shaft 13 as described above. Accordingly, it is possible to facilitate work of mounting the steering sensor unit on the steering shaft 13 and to prevent a reduction in the accuracy in detecting the rotational angle of the steering wheel caused by an eccentricity of the rotor 3 and the code plate 4 with respect to the casing 9, a reduction in smooth operability due to an eccentricity between the rotor 7 and the casing 9, etc.

Prevention of water from entering the steering sensor unit also contributes to preventing a reduction in the accuracy in detecting the rotational angle of the steering wheel.

Furthermore, in the steering sensor unit of this embodiment, since the external output connector 10 of the steering sensor 1 is attached as an integral connector to the end surface 9c of the casing 9 and the cable 8 for the rotary connector 2 is led out as the external output cable 11 similarly from the end surface 9c of the casing 9, the radial size of the steering sensor unit can be made smaller than that would be resulted if the external output connector 10 and the external output cable 11 are disposed on the outer circumferential surface 9d of the casing 9. This leads to the increased degree of freedom in design and layout of components around the driver's seat. In addition, since a wider space is left around the steering sensor unit, the efficiency of wiring and other incidental work can be improved.

The fitting pawls 3a, 9e for joining the rotors 3, 7 and the casing 9 to each other can be formed continuously in the circumferential direction so as to provide a complex fitting structure, i.e., the so-called labyrinth structure. By thus fitting the rotors 3, 7 and the casing 9 to each other through the labyrinth structure, a sealing degree of the interior of the casing 9 is so enhanced that dirt, dust and water are surely prevented from entering the casing 9 from the outside. Therefore, a reduction in the accuracy in detecting the rotational angle of the steering wheel due to intrusion of those foreign matters can be prevented.

Incidentally, if the joint portions 6 for coupling the rotor 3 of the steering sensor 1 and the steering wheel 14 to each other are too long in the axial direction of the steering shaft 13 or too elastic, this would affect the accuracy of the steering sensor 1 in detecting the rotational angle of the steering wheel. Therefore, the length and rigidity of the joint portions 6 are selected so that the resultant effect is kept within an extent not problematic from the practical view of point.

Figure 3:
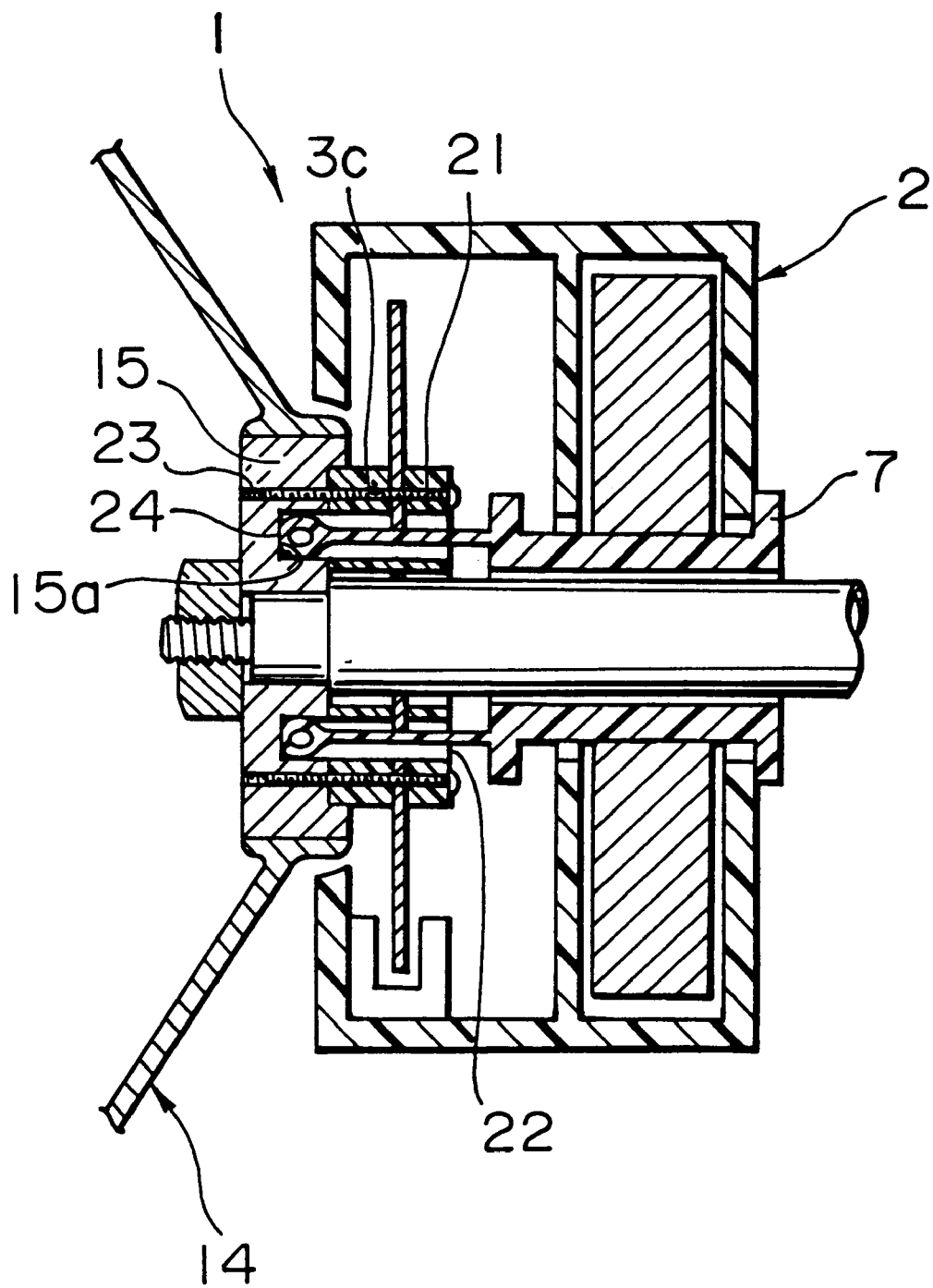
FIG. 3 is a cross-sectional view of the steering sensor unit according to a second embodiment.

A second embodiment of the steering sensor unit according to the present invention will be described below with reference to FIG. 3. FIG. 3 is a cross-sectional view of the steering sensor unit of the second embodiment. In FIG. 3, denoted by reference numeral 21 is a set screw for mounting the steering sensor 1, 22 is a through hole bored in the rotor 3 of the steering sensor 1 for penetration of an actuator therethrough, 23 is a threaded hole bored in the central hub 15 of the steering wheel 14, and 24 is a joint portion provided on the rotor 7 of the rotary connector 2 for interconnection between the rotor 7 and the steering wheel 14. Other parts corresponding to those shown in FIGS. 1 and 2 are denoted by the same reference-numerals.

The steering sensor unit of this embodiment is featured, as shown in FIG. 3, in that the rotor 3 of the steering sensor 1 including the code plate 4 integrally attached to the rotor 3 is directly screwed to a bottom surface of the central hub 15 of the steering wheel 14, and the joint portions 24 provided on the rotor 7 of the rotary connector 2 are fitted into the engagement holes 15a bored in the central hub 15, causing the rotor 7 of the rotary connector 2 to be directly rotated by the steering wheel 14.

More specifically, the steering sensor 1 is directly attached to the bottom surface of the central hub 15 by inserting the set screws 21 through the screw penetration holes 3c bored in the rotor 3 and then threading distal ends of the set screws 21 into the threaded holes 23 bored in the central hub 15. On the other hand, the rotary connector 2 is disposed below the steering sensor 1, but also directly coupled to the steering wheel 14 by inserting the joint portions 24 projecting vertically to and from an end surface of the rotor 7 through the through holes 22 bored in the rotor 3 of the steering sensor 3 and then fitting distal ends of the joint portions 24 projecting out of the through holes 22 into the engagement holes 15a bored in the central hub 15. The remaining structure is the same as that of the steering sensor unit according to the first embodiment and hence will not be described here.

In addition to the similar advantages as obtainable with the steering sensor unit of the first embodiment, the steering sensor unit of this second embodiment can provide an advantage that since the rotor 3 of the steering sensor 1 is directly screwed to the bottom surface of the central hub 15 of the steering wheel 14, a reduction in the accuracy in detecting the rotational angle of the steering wheel due to a torsion of the rotor 3. Another advantage is that since the joint portions 24 are projected from the rotor 7 of the rotary connector 2 and fitted into the engagement holes 15a bored in the central hub 15 of the steering wheel 14, thereby directly coupling the rotor 7 of the rotary connector 2 and the steering wheel 14, a clearance that should be set between the rotor 7 and the casing 9 can be easily adjusted and smooth operability of the rotary connector 2 can be further improved.

Figure 4:
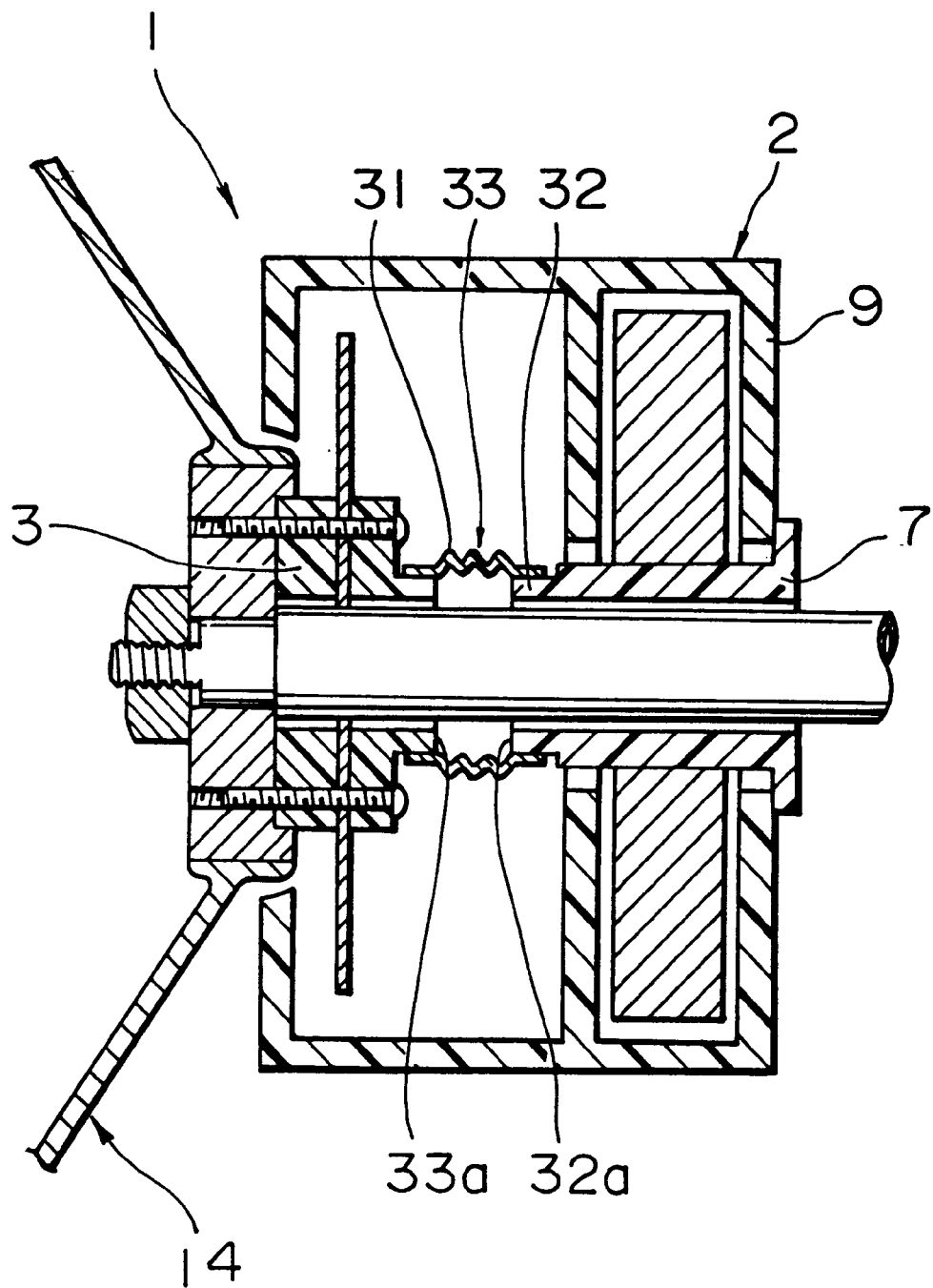
FIG. 4 is a cross-sectional view of a steering sensor unit according to a third embodiment.

A third embodiment of the steering sensor unit according to the present invention will be described below with reference to FIG. 4. FIG. 4 is a cross-sectional view of the steering sensor unit of the third embodiment. In FIG. 4, denoted by reference numeral 31 is a bellows joint portion formed on the rotor 3 of the steering sensor 1, 32 is a bellows joint portion formed on the rotor 7 of the rotary connector 2, and 33 is a bellows for coupling the rotor 3 of the steering sensor 1 and the rotor 7 of the rotary connector 2 to each other. Other parts corresponding to those shown in FIGS. 1 and 2 are denoted by the same reference numerals.

The steering sensor unit of this embodiment is featured, as shown in FIG. 4, in that the rotor 3 of the steering sensor 1 and the rotor 7 of the rotary connector 2 are interconnected through the bellows 33 which is capable of extending and contracting in the axial direction and serves to absorb an eccentricity between both the rotors 3 and 7.

The bellows 33 is mounted in place by fitting a cylindrical portion 33a formed at its one end over an outer circumference of the bellows joint portion 31 formed on the rotor 3, fitting a cylindrical portion 33b formed at its opposite end over an outer circumference of the bellows joint portion 32 formed on the rotor 7, and fixedly fastening the fitted portions by fixing means, such as screws, at both ends of the bellows 33.

With the steering sensor unit of this embodiment wherein the rotor 3 of the steering sensor 1 and the rotor 7 of the rotary connector 2 are interconnected through the bellows 33 for absorbing an eccentricity between both the rotors 3 and 7, even if there occurs an eccentricity between the rotor 3 of the steering sensor 1 and the rotor 7 of the rotary connector 2, the casing 9 will not interfere with the rotor 7 of the rotary connector 2 and smooth operation of the rotary connector 2 and hence the steering wheel 14 is ensured.

While the above embodiments have been described, by way of example, in connection with the steering sensor unit wherein the steering sensor 1 is combined with the rotary connector 2 maintaining electrical connection through reeling-in and -out of the loosely coiled cable, the gist of the present invention is not limited to those embodiments. The present invention is also likewise applied to a steering sensor unit wherein the steering sensor 1 is combined with the rotary connector 2 maintaining electrical connection through slide contact of a brush with electrical paths formed in the shape of a ring.

Figure 5:
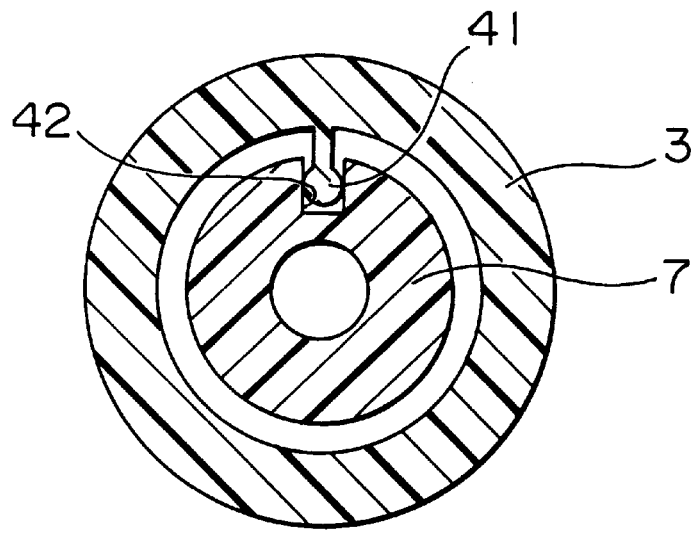
FIG. 5 is a cross-sectional view of a steering sensor unit according to a fourth embodiment.
Figure 6:
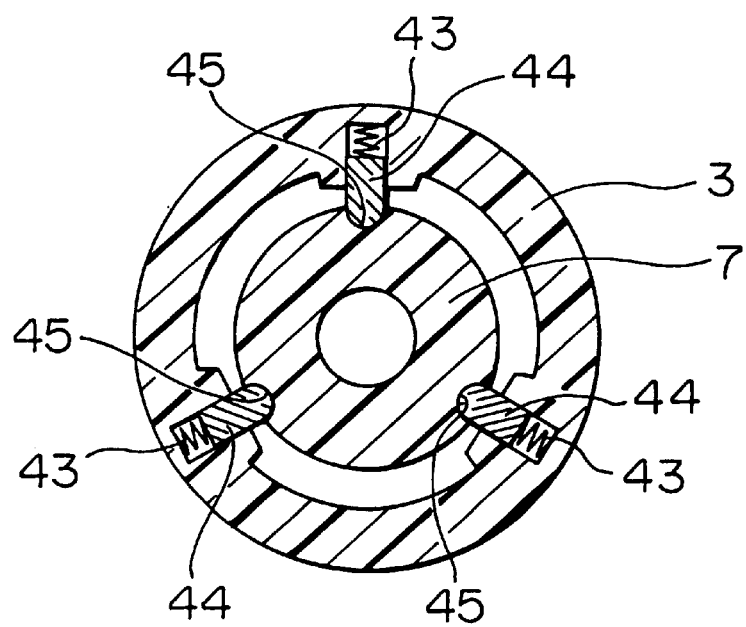
FIG. 6 is a cross-sectional view of a steering sensor unit according to a fifth embodiment.

Also, while the above third embodiment employs the bellows 33 as means for absorbing an eccentricity occurred between the rotor 3 of the steering sensor 1 and the rotor 7 of the rotary connector 2, other eccentricity absorbing means as shown in FIGS. 5 and 6 may also be used instead. In a fourth embodiment shown in FIG. 5, an actuator 41 is formed on the rotor 3 of the steering sensor 1, and a recessed groove 42 engageable with the actuator 41 is formed in the rotor 7 of the rotary connector 2. The actuator 41 and the recessed groove 42 are engaged with each other so that the rotation of the rotor 3 can be transmitted to the rotor 7 while both the rotors 3, 7 are allowed to move relatively in the radial direction. Of course, contrary to the above arrangement, the actuator 41 may be projected on the rotor 7 of the rotary connector 2 and the recessed groove 42 may be formed in the rotor 3 of the steering sensor 1. In a fifth embodiment shown in FIG. 6, a plurality of actuators 44 biased radially inward by springs 43 are provided on the rotor 3 of the steering sensor 1, and a plurality of recessed grooves 45 engageable with the actuators 44 are formed in the rotor 7 of the rotary connector 2. The actuators 44 and the recessed grooves 45 are engaged with each other so that the rotation of the rotor 3 can be transmitted to the rotor 7 while both the rotors 3, 7 are allowed to move relatively in the radial direction. In this case, the arrangement may also be of course modified contrary to the above such that the actuators 44 are provided on the rotor 7 of the rotary connector 2 and the recessed grooves 45 are formed in the rotor 3 of the steering sensor 1.

As fully described above, according to the present invention, since the steering sensor 1 is disposed in a position close to the steering wheel and the rotary connector is disposed below the steering sensor, it is possible to prevent or abate a reduction in the detection accuracy of the steering sensor due to a torsion of the rotor of the steering sensor, and to improve the accuracy in detecting the rotational angle of the steering wheel. Also, the present invention can improve the mounting accuracy of the steering sensor and this point is also effective in improving the accuracy in detecting the rotational angle of the steering wheel.

What is claimed is:

1. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor being provided with a joint portion for transmitting rotation of said steering wheel to the rotor of said steering angle sensor, said steering sensor unit being mounted on a steering shaft such that said steering angle sensor is disposed in a position close to said steering wheel and said rotary connector is disposed below said steering angle sensor, the rotor of said steering angle sensor being coupled to a rotor of said rotary connector.

2. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor and a rotor of said rotary connector being provided with joint portions for transmitting rotation of said steering wheel respectively to the rotor of said steering angle sensor and the rotor of said connector, said steering sensor unit being mounted on a steering shaft such that said steering angle sensor is disposed in a position close to said steering wheel and said rotary connector is disposed below said steering angle sensor.

3. A steering sensor unit according to claim 1, wherein the rotor of said steering angle sensor and the rotor of said rotary connector are joined into a one-piece structure.

4. A steering sensor unit according to claim 1, wherein the rotor of said steering angle sensor and the rotor of said rotary connector are coupled to each other through eccentricity absorbing means.

5. A steering sensor unit according to claim 2, wherein the rotor of said steering angle sensor and the rotor of said rotary connector are coupled to each other through eccentricity absorbing means.

6. A steering sensor unit according to claim 1, wherein an external output terminal of said steering angle sensor is disposed on a bottom surface of a casing for said rotary connector.

7. A steering sensor unit according to claim 2, wherein an external output terminal of said steering angle sensor is disposed on a bottom surface of a casing for said rotary connector.

8. A steering sensor unit according to claim 4, wherein said eccentricity absorbing means comprises an actuator provided on the rotor of said steering angle sensor, and a recessed groove formed in the rotor of said rotary connector and engaging said actuator.

9. A steering sensor unit according to claim 5, wherein said eccentricity absorbing means comprises an actuator provided on the rotor of said steering angle sensor, and a recessed groove formed in the rotor of said rotary connector and engaging said actuator.

10. A steering sensor unit according to claim 4, wherein said eccentricity absorbing means comprises a recessed groove formed in the rotor of said steering angle sensor, and an actuator provided on the rotor of said rotary connector and engaging said recessed groove.

11. A steering sensor unit according to claim 5, wherein said eccentricity absorbing means comprises a recessed groove formed in the rotor of said steering angle sensor, and an actuator provided on the rotor of said rotary connector and engaging said recessed groove.

12. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor being provided with a joint portion for transmitting rotation of said steering wheel to the rotor of said steering angle sensor, said steering sensor unit being mounted on a steering shaft such that said steering angle sensor is disposed in a position close to said steering wheel and said rotary connector is disposed below said steering angle sensor, the rotor of said steering angle sensor being coupled to a rotor of said rotary connector, wherein:
the rotor of said steering angle sensor and the rotor of said rotary connector are coupled to each other through eccentricity absorbing means, and
said eccentricity absorbing means comprises an actuator provided on the rotor of said steering angle sensor, and a recessed groove formed in the rotor of said rotary connector and engaging said actuator.

13. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor and a rotor of said rotary connector being provided with joint portions for transmitting rotation of said steering wheel respectively to the rotor of said steering angle sensor and the rotor of said connector, said steering sensor unit being mounted on a steering shaft such that said steering angle sensor is disposed in a position close to said steering wheel and said rotary connector is disposed below said steering angle sensor, wherein:

the rotor of said steering angle sensor and the rotor of said rotary connector are coupled to each other through eccentricity absorbing means, and said eccentricity absorbing means comprises an actuator provided on the rotor of said steering angle sensor, and a recessed groove formed in the rotor of said rotary connector and engaging said actuator.

14. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor being provided with a joint portion for transmitting rotation of said steering wheel to the rotor of said steering angle sensor, said steering sensor unit being mounted on a steering shaft such that said steering angle sensor is disposed in a position close to said steering wheel and said rotary connector is disposed below said steering angle sensor, the rotor of said steering angle sensor being coupled to a rotor of said rotary connector, wherein:

the rotor of said steering angle sensor and the rotor of said rotary connector are coupled to each other through eccentricity absorbing means, and said eccentricity absorbing means comprises a recessed groove formed in the rotor of said steering angle sensor, and an actuator provided on the rotor of said rotary connector and engaging said recessed groove.

15. A steering sensor unit comprising a steering angle sensor for detecting information about rotation of a steering wheel and a rotary connector for electrically connecting an electric system provided on said steering wheel to an electric system provided on a vehicle body, a rotor of said steering angle sensor and a rotor of said rotary connector being provided with joint portions for transmitting rotation of said steering wheel respectively to the rotor of said steering angle sensor and the rotor of said connector, said steering sensor unit being mounted on a steering shaft such that said steering angle sensor is disposed in a position close to said steering wheel and said rotary connector is disposed below said steering angle sensor, wherein:

the rotor of said steering angle sensor and the rotor of said rotary connector are coupled to each other through eccentricity absorbing means, and said eccentricity absorbing means comprises a recessed groove formed in the rotor of said steering angle sensor, and an actuator provided on the rotor of said rotary connector and engaging said recessed groove.

* * * * *